US 6,679,796 B2

(12) United States Patent
Sugano (10) Patent No.: US 6,679,796 B2
(45) Date of Patent: Jan. 20, 2004

(54) TRANSMISSION UNIT FOR HYBRID VEHICLE (75) Inventor: Taku Sugano, Shizuoka (JP)

(73) Assignee: Jatco Ltd, Fuji (JP)

(*) Notice: Subject to any disclaimer, the term of this patent is extended or adjusted under 35 U.S.C. 154(b) by 0 days.

(21) Appl. No.: 09/785,484

(22) Filed: Feb. 20, 2001

(65) Prior Publication Data
US 2001/0024996 A1 Sep. 27, 2001

(30) Foreign Application Priority Data
Mar. 22, 2000 (JP) ....................... 2000-079547

(51) Int. Cl.$^7$ ............................................. F16H 63/00
(52) U.S. Cl. ..................... 474/28; 180/65.2; 310/68; 310/85
(58) Field of Search ............... 74/606 R; 290/40 C, 290/46; 180/65.2; 310/85, 68 B; 474/28; 192/21.5

(56) References Cited

U.S. PATENT DOCUMENTS

| 4,343,385 A | * | 8/1982 | Kosuda et al. ............... 192/21.5 |
| 4,466,521 A | * | 8/1984 | Hattori et al. ................. 477/39 |
| 5,875,691 A | * | 3/1999 | Hata et al. ...................... 475/5 |
| 6,008,545 A | * | 12/1999 | Nagano et al. ................ 290/1 C |
| 6,073,713 A | * | 6/2000 | Brandenburg et al. ....... 180/65.2 |
| 6,373,155 B1 | * | 4/2002 | Shimizu et al. ............... 310/254 |

FOREIGN PATENT DOCUMENTS

JP 2000-9213 1/2000

OTHER PUBLICATIONS

U.S. patent application Ser. No. 09/785,454, Sugano, filed Feb. 21, 2001.
U.S. patent application Ser. No. 09/785,455, Hasegawa, filed Feb. 20, 2001.
U.S. patent application Ser. No. 09/785,483, Sugano, filed Feb. 20, 2001.
U.S. patent application Ser. No. 09/785,485, Sugano, filed Feb. 20, 2001.

* cited by examiner

Primary Examiner—Thomas R. Hannon
Assistant Examiner—Vicky A. Johnson
(74) Attorney, Agent, or Firm—Foley & Lardner (57) ABSTRACT In a transmission unit for a hybrid vehicle, an electromagnetic clutch, a motor, and a continuously variable transmission CVT are disposed in the transmission unit and a resolver to detect a position of a rotor of the motor is disposed on an input axle to input a revolution from the electromagnetic clutch to the motor and to the CVT and is disposed on the input axle at an inner side with respect to a stator of the motor.

10 Claims, 9 Drawing Sheets

FIG.9

TRANSMISSION UNIT FOR HYBRID VEHICLE

BACKGROUND OF THE INVENTION

1. Field of the Invention

The present invention relates to a transmission unit for a hybrid vehicle. The hybrid vehicle is provided with an internal combustion engine and a motor/generator (an electric motor that functions as a generator), each output torque of these drive sources being transmitted to a variable gear unit (transmission mechanism) to achieve a vehicular run driving force by either or both of the engine and the motor.

2. Description of the Related Art

A Japanese Patent Application First Publication No. Heisei 2000-9213 (P2000-9213A) published on Jan. 11, 2000 exemplifies a previously proposed transmission unit for a hybrid vehicle.

The previously proposed transmission unit for the hybrid vehicle disclosed in the above-identified Japanese Patent Application First Publication includes: a clutch chamber formed with a first housing and a first partitioning wall; a motor chamber formed with a second housing, the first partitioning wall, and a second partitioning wall; and a transmission chamber formed with a third housing and the second partitioning wall.

A revolution of an engine is inputted to an electromagnetic clutch in the clutch chamber. An output revolution via the electromagnetic clutch is transmitted to an electric motor installed within the motor chamber and to a transmission installed within the transmission chamber through an input axle of the transmission unit.

A resolver is installed on a support of the input axle within the third housing. This resolver functions to detect a revolution position of a rotor of the motor. Then, a motor driving force control for the motor can be carried out on the basis of a detection signal of the resolver.

SUMMARY OF THE INVENTION

The electric motor in the transmission unit includes a rotor on which a North (N) pole and a South (S) pole of a permanent magnet are alternatingly aligned and a stator which is an electromagnet. The motor controller supplies a control current of the stator, detecting on which position of the rotor the N pole and S pole are placed. If, due to a tolerance accumulated during the assembly, the resolver is out of a standard position, the motor driving force cannot optimally be controlled. Hence, it is necessary to manually adjust the position of the resolver after the assembly operation of the whole transmission unit.

However, in the previously proposed transmission unit disclosed in the above-identified Japanese Patent Application, the supply of a hydraulic to an axial center oil passage disposed within the input axle is carried out from a hydraulic circuit installed within the third housing and the resolver is disposed within the third housing including the hydraulic circuit. Therefore, it becomes impossible to manually adjust the resolver itself or its position with respect to the rotor.

In addition, in order to avoid such a problem as described above, it may be considered that the hydraulic circuit is interposed between the resolver and the CVT and the resolver itself is disposed within a dry chamber.

However, in order to provide a space for the resolver, the transmission unit itself needs to be elongated in the axial direction thereof.

It is therefore an object of the present invention to provide an improved transmission unit for a hybrid vehicle in which a rotor position detector, viz., a resolver can be disposed therein without an increase in a dimension in an axial direction of the transmission unit and the assembled position of the rotor position detector can be adjusted even after the assembly of the rotor position detector into the transmission unit.

The above-described object can be achieved by providing a transmission unit for a hybrid vehicle, comprising: an electromagnetic clutch; an electric motor; a transmission comprising an input axle to input revolution from the electromagnetic clutch to the electric motor and to a transmission mechanism section thereof; and a rotor position detector to detect a revolution position of a rotor of the electric motor, the rotor position detector being disposed on the input axle of the transmission at an inner side with respect to a stator coil of the electric motor.

DETAILED DESCRIPTION OF THE PREFERRED EMBODIMENT

Reference will hereinafter be made to the drawings in order to facilitate a better understanding of the present invention.

Figure 1:
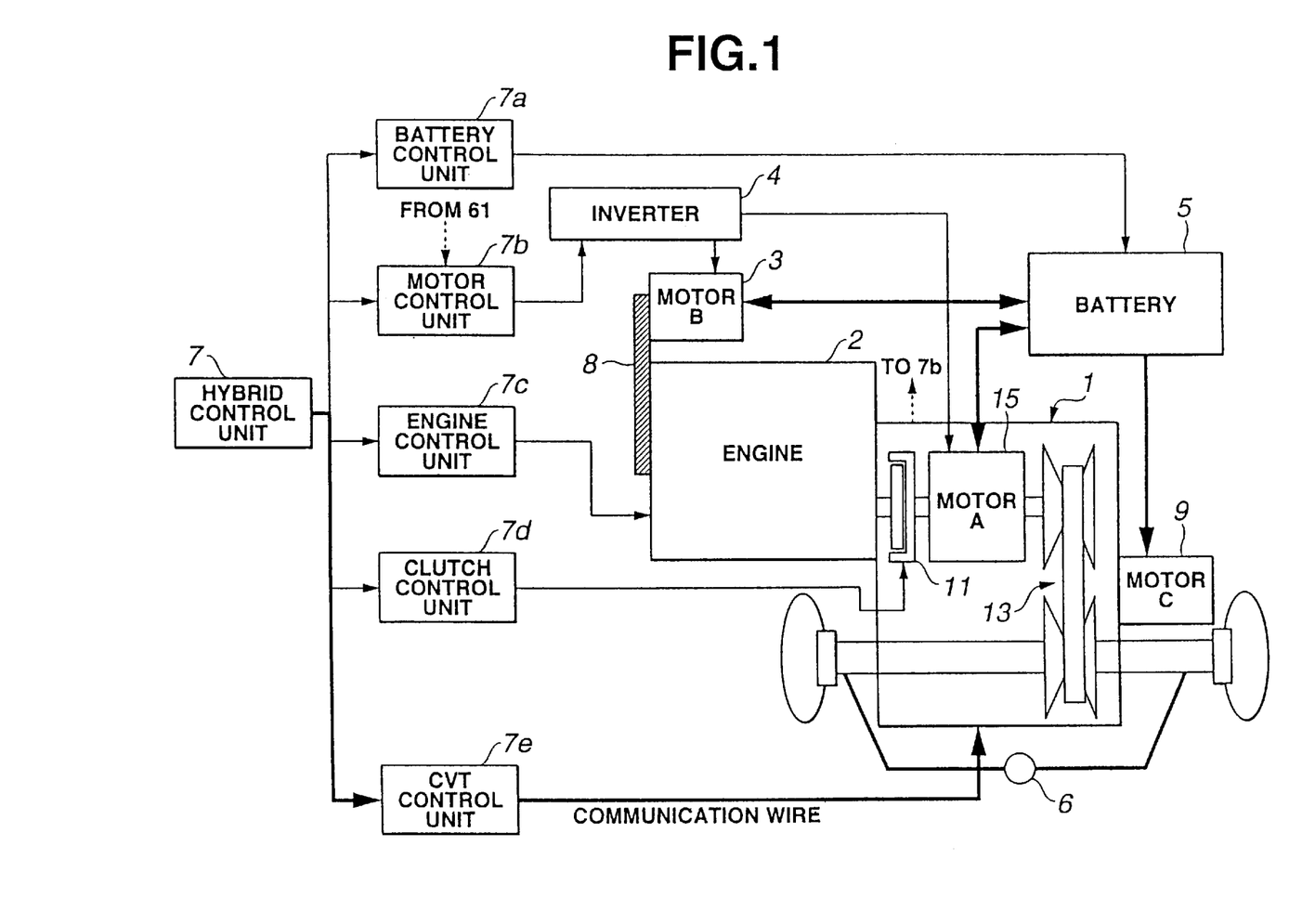
FIG. 1 is a main circuit block diagram of a whole hybrid vehicle to which a transmission unit in a preferred embodiment according to the present invention is applicable.

FIG. 1 shows a circuit block diagram representing a configuration of a hybrid vehicle in a preferred embodiment according to the present invention.

FIG. 1 shows a circuit block diagram representing a configuration of a hybrid vehicle in a preferred embodiment according to the present invention. In FIG. 1, reference numeral 1 denotes a transmission unit, reference numeral 2 denotes an engine, reference numeral 3 denotes a motor B for a power r generation and/or engine start purpose, reference numeral 5 denotes a battery, reference numeral 6 denotes a motor assisted power steering, reference numeral 7 denotes a hybrid control 1 unit, and reference numeral 8 denotes a chain.

An electromagnetic clutch 11, an electric motor A 15 to derive vehicular road wheels, and a continuously variable transmission (hereinafter, referred to as a CVT) 13 are housed within a transmission unit 1. The motor A 15 functions as an energy regeneration motor when the vehicle is decelerated or braked. In addition, a motor C 9 is provided to drive a motor powered hydraulic pump. In the hybrid vehicle, in which a running area only by a motor drive is present, a hydraulic pressure during the vehicular run only by the driving force of motor A 15 (especially, a pulley hydraulic pressure of CVT 13) cannot be obtained. In addition, for the same reason, an assistance force of the power steering 6 is motor driven to assist the motor.

The motor B 3 used for power generation/engine start purpose is mounted on an engine block. The engine 2 is connected to motor B via the chain 8. The motor B functions as a generator under a normal condition but functions as a starter when the vehicle is started.

Each control unit 7a controls a charge/discharge operation of the battery 5. The motor control unit 7b controls the motor B 3 via an inverter 4. The engine control unit 7c controls an operation of the engine 2. The clutch control unit 7d controls an engagement/disengagement of the electromagnetic clutch 11. The CVT control unit 7e controls generally a variable speed ratio of the CVT via a communication wire. The hybrid control unit 7 controls integrated operations of the essential vehicular parts to be controlled by the respective control units 7a through 7e.

Next, an operation of a whole drive system of the hybrid vehicle shown in FIG. 1 will be described.

The hybrid vehicle shown in FIG. 1 has adopted a parallel run form and the motor A 15 functions as an assistance of the engine 2 whose fuel economy has the precedence over the output torque and power.

The CVT 13 serves as an adjuster for the engine 2 to be driven at an optimum fuel consumption point.

When the electromagnetic clutch 11 is turned off (released), the hybrid vehicle runs only by the drive of the motor A 15.

On and off operations of the electromagnetic clutch 11 are automatically controlled at optimum by the clutch control unit 7d upon receipt of its corresponding command issued from the hybrid control unit 7.

(When the System Is Activated)

When the engine 2 is started, the motor B 3 functions as the starter to start the engine 2.

(When the Vehicle Is Started And Runs at a Low Vehicular Velocity)

When the hybrid vehicle is started under a low load under which a fuel consumption efficiency of the engine 2 is low or runs at a relatively low vehicular velocity, the engine 2 stops so that the vehicle runs only by the motor A 15.

If the vehicle is started or runs at the low vehicular velocity, the engine 2 is immediately started if the load becomes large (large opening angle of an engine throttle valve). The clutch 11 is turned ON so that the vehicle is driven by both engine 2 and motor A 15.

(When the Hybrid Vehicle Runs Under a Normal Condition)

The hybrid vehicle runs mainly by the engine 2 when the vehicle runs at the normal condition, viz., at a steady state. In this case, the variable speed ratio control for the CVT 13 causes an engine speed Ne of the engine 2 to be adjusted so that a drive on a best fuel economy line can be achieved.

(When a High Load Drive is Performed)

When the hybrid vehicle runs at a high load such that the driving force becomes insufficient even if the engine 2 provides a maximum output, electrical energy is positively supplied from the battery 5 to the motor A 15 so that the whole driving force can be augmented.

(When the Vehicle is Decelerated)

When the vehicle is decelerated, a fuel supply cut-off operation is carried out in the engine 2. At the same time, motor A 15 functions as the generator and part of kinetic energy usually disposed of is converted into the electrical energy. This electrical energy is collected and stored in the battery 5.

(When the Vehicle is Reversed)

No reverse gear is set in the CVT 13. Hence, during a vehicular reverse operation, the clutch 11 is released and the motor A 15 is reversed so that the vehicle runs only by the drive of the motor A 15.

(When the Vehicle Stops)

When the hybrid vehicle stops, the engine 2 stops. However, the engine 2 does not stop: (a) if the battery 5 needs to be recharged; (b) if an operation of a compressor in an air conditioner is required; or (c) during a warm-up of the engine.

Figure 2:
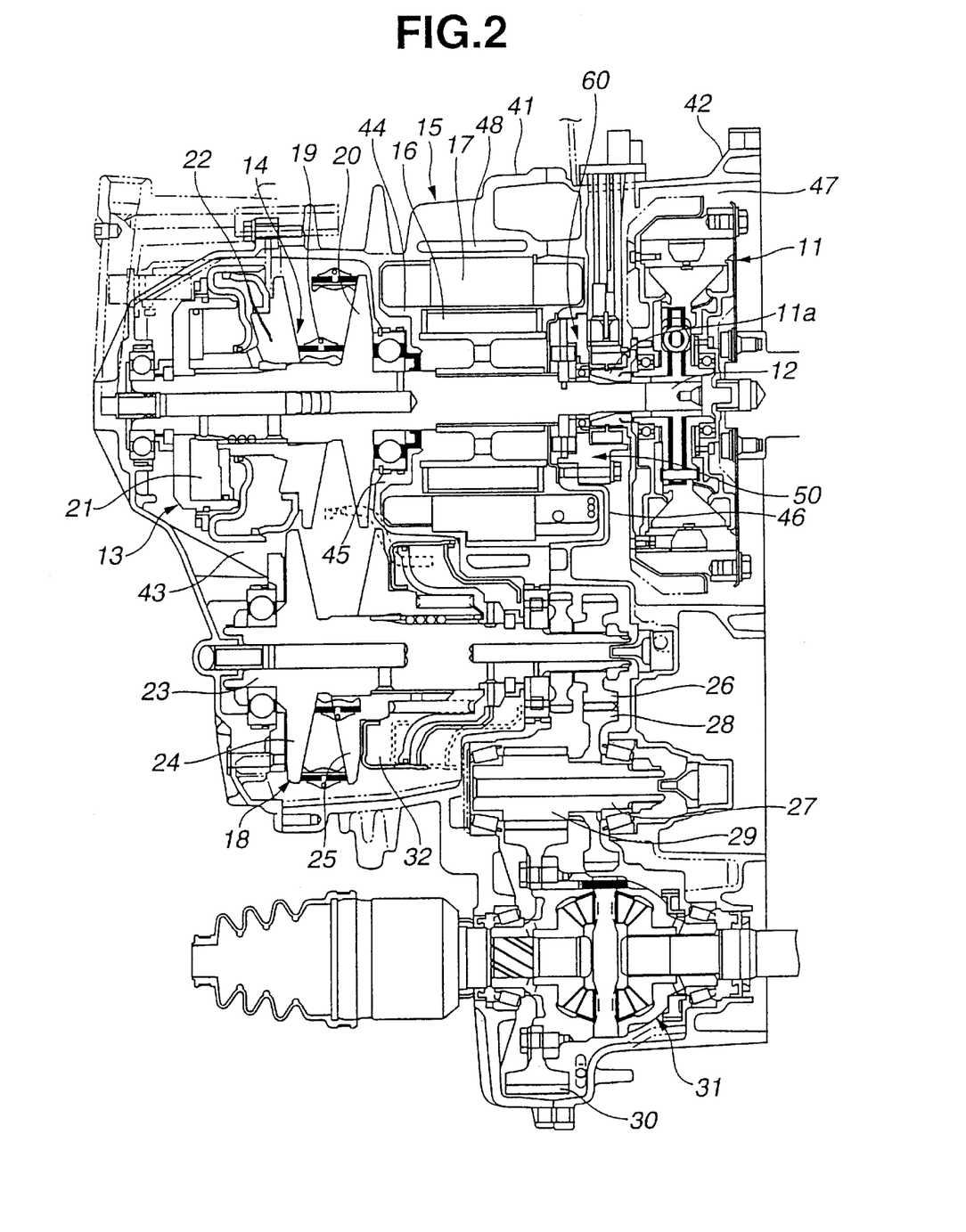
FIG. 2 is a cross sectional view of the transmission unit in the preferred embodiment for the hybrid vehicle having a belt-type continuously variable transmission (CVT).

FIG. 2 shows a cross se ional view of a transmission unit 1 of the hybrid vehicle having the belt type CVT show in FIG. 1 to which the transmission unit 1 according to the present invention is applicable. In FIG. 2, an electromagnetic type clutch 11 is linked to an output axle of the engine 2 as rotary transmission mechanism. A slip ring 11a supplies electric power to the electromagnetic clutch 11.

An output axle of the electromagnetic clutch 11 is linked to an input axle 12 of the transmission. A drive pulley 14 for the CVT 13 is disposed on an end of the input axle 12 and the motor A 15 for the normal run vehicular purpose is interposed between the drive pulley 14 and the electromagnetic clutch 11.

A front cover assembly 50 is installed between the motor A 15 and the electromagnetic clutch 11. The front cover assembly 50 includes a resolver 60 which functions as a holder 52 to hold an electrode pole brush 11b through which the power is supplied to the electromagnetic clutch 11 and which detects a position of a rotor 16 of the motor A 15.

The motor A 15 includes: the rotor 16 fixed on the input axle 12; and a stator 17 fixed on the unit housing. Upon receipt of the power supply from the battery 5, the motor A 15 drives the input axle 12 or functions as the generator on the basis of a revolving force (torque) exerted by the input axle 12 during a vehicular deceleration.

The CVT 13 includes the drive pulley 14, driven pulley 18, and a belt 19 to transmit the revolving force of the drive pulley 14 to the driven pulley 18.

The drive pulley 14 includes a stationary truncated cone-shaped plate 20 which is revolved together with the input axle 12 (integrated to the input axle); and a movable truncated cone-shaped plate 22 which is disposed at an opposite direction to the stationary truncated cone-shaped plate 20 to form a letter-V shaped pulley groove and which is movable in an axial direction of the input axle 12 by a hydraulic pressure acted upon a drive pulley cylinder chamber 21.

The driven pulley 18 is disposed on a driven axle 23. The driven pulley 18 includes a stationary truncated cone-shaped plate 24 which revolves together with the driven axle 23; and a movable truncated cone-shaped plate 25 which is disposed at an opposite direction to the stationary truncated cone-shaped plate 24 to form a letter-V shaped groove and movable in an axial direction of the driven axle 23 by a hydraulic pressure acted upon a driven pulley cylinder chamber 32 in the axial direction of the driven axle 23.

A drive gear 26 is secured to the driven axle 23. This drive gear 26 is meshed with an idler gear 28 on an idler axle 27. A pinion 29 installed on an idler axle 27 is meshed with a final gear 30. The final gear 30 drives a drive axle connected to driven road wheels via a differential unit 31.

A revolving force inputted from the engine output axle 10 toward the CVT 13 is transmitted to the differential unit 31 via the drive pulley 14, the belt 19, the driven pulley 18, the driven axle 23, the drive gear 26, the idler axle 27, the pinion 29, and the final gear 30.

During the power transmission described above, the movable truncated cone shaped plate 22 of the drive pulley 14 and the plate 25 of the driven pulley 18 are moved in their drive and driven axle directions to vary radial portions thereof on which the belt 19 is contacted. Consequently, a revolution ratio between the drive pulley 14 and the driven pulley 18, viz., a speed ratio (so-called, a gear ratio) of the CVT can be varied. Such a control as varying a width of the letter-V shaped pulley groove formed between the drive pulley 14 and the driven pulley 18 is carried out by a hydraulic control from either the drive pulley cylinder chamber 21 or the driven pulley cylinder chamber 32 via the CVT control unit 7e.

The transmission housing in which the transmission mechanism described above and the motor A 15 are housed includes: a second housing 41 in which the CVT 13 and motor A 15 are housed; and a first housing 42 in which the electromagnetic clutch 11 is housed. These first and second housings 41 and 42 are divided axially.

The second housing 41 is partitioned into a transmission chamber 43 into which the CVT 13 is incorporated and a motor chamber 44 into which the motor A 15 is incorporated via a second partitioning wall 45.

A first partitioning wall 46 is formed on one end surface on which the second housing 41 is coupled. When the housings 41 and 42 are coupled, the motor chamber 44 is defined between each partitioning wall 45, 46.

When the other end surface of the first housing 42 is coupled to the engine 2, the clutch chamber 47 is defined between the first partitioning wall 46 and the engine 2.

The stator 17 of the motor A 15 is incorporated into the motor chamber 44 by a shrink fitting to simplify the motor distance. On the other hand, a cooling water is circulated into a cooling water jacket 48 formed in the second housing 41 to enclose the stator 17. Thus, an efficient cooling of the motor A 15 can be achieved.

Figure 3:
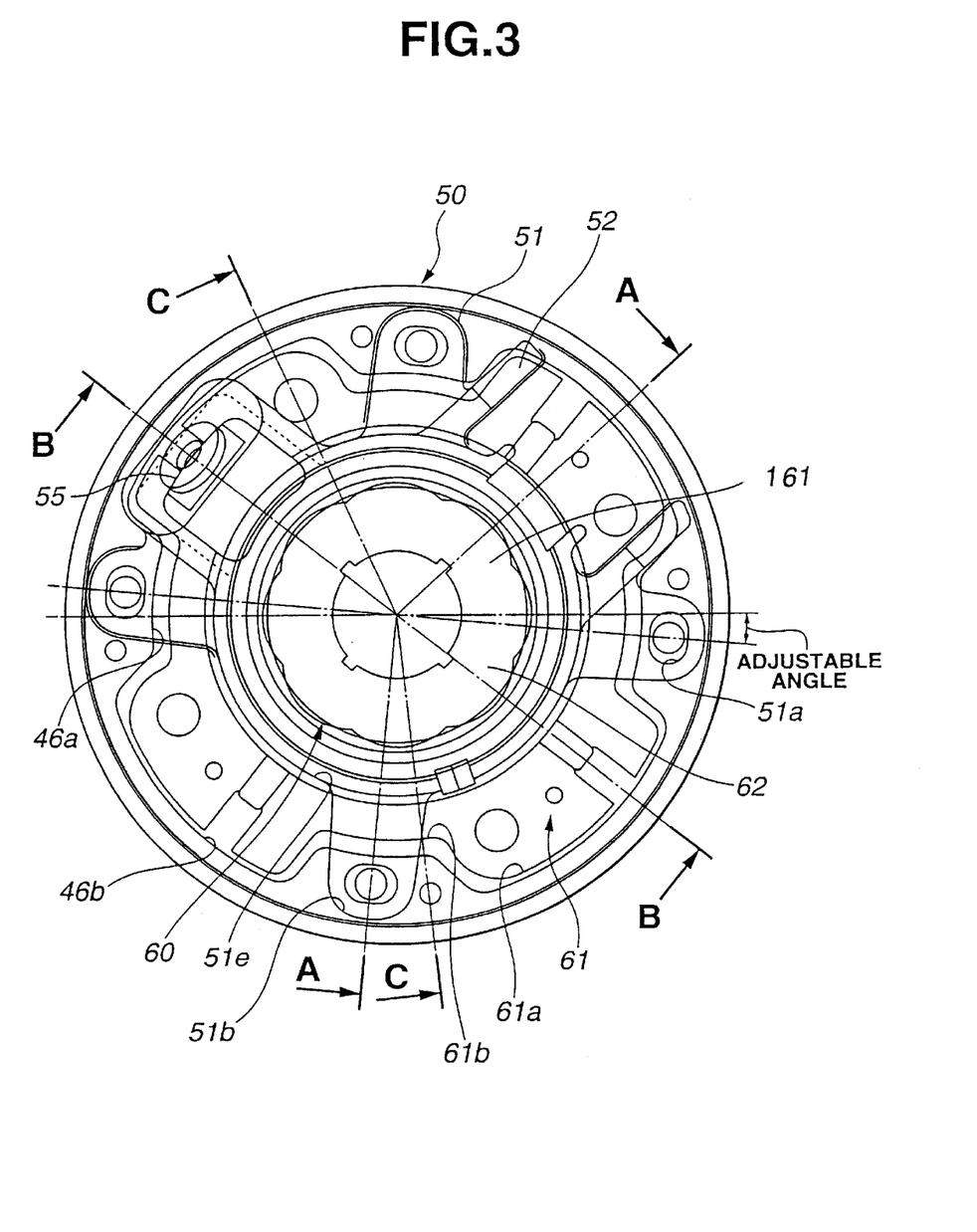
FIG. 3 is a front elevation view of a front cover assembly in the preferred embodiment according to the present invention.

FIG. 3 shows a front view of the front cover assembly 50 to which the present invention is applicable.

Figure 4:
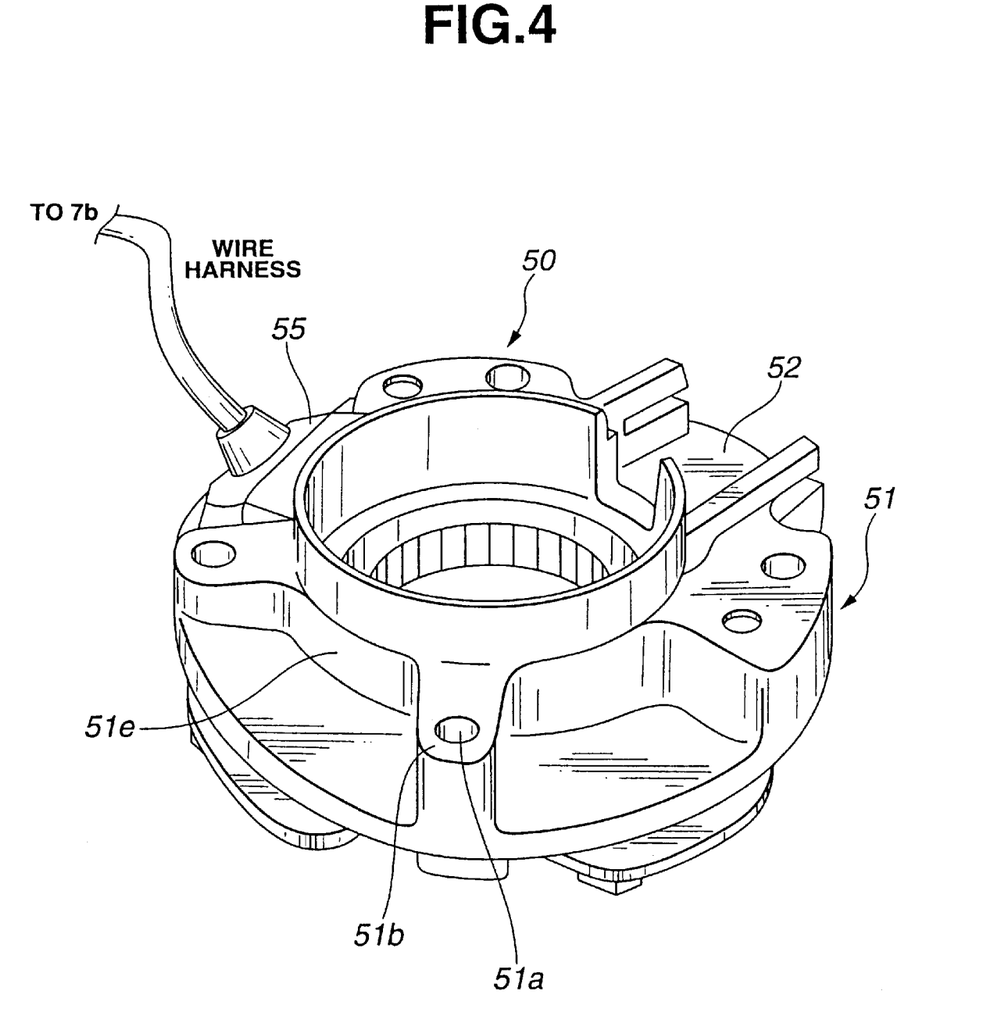
FIG. 4 is a perspective view of the front cover assembly as viewed from an electromagnetic clutch.

FIG. 4 shows a perspective view of the front cover assembly 50 as viewed from the electromagnetic clutch 11.

Figure 5:
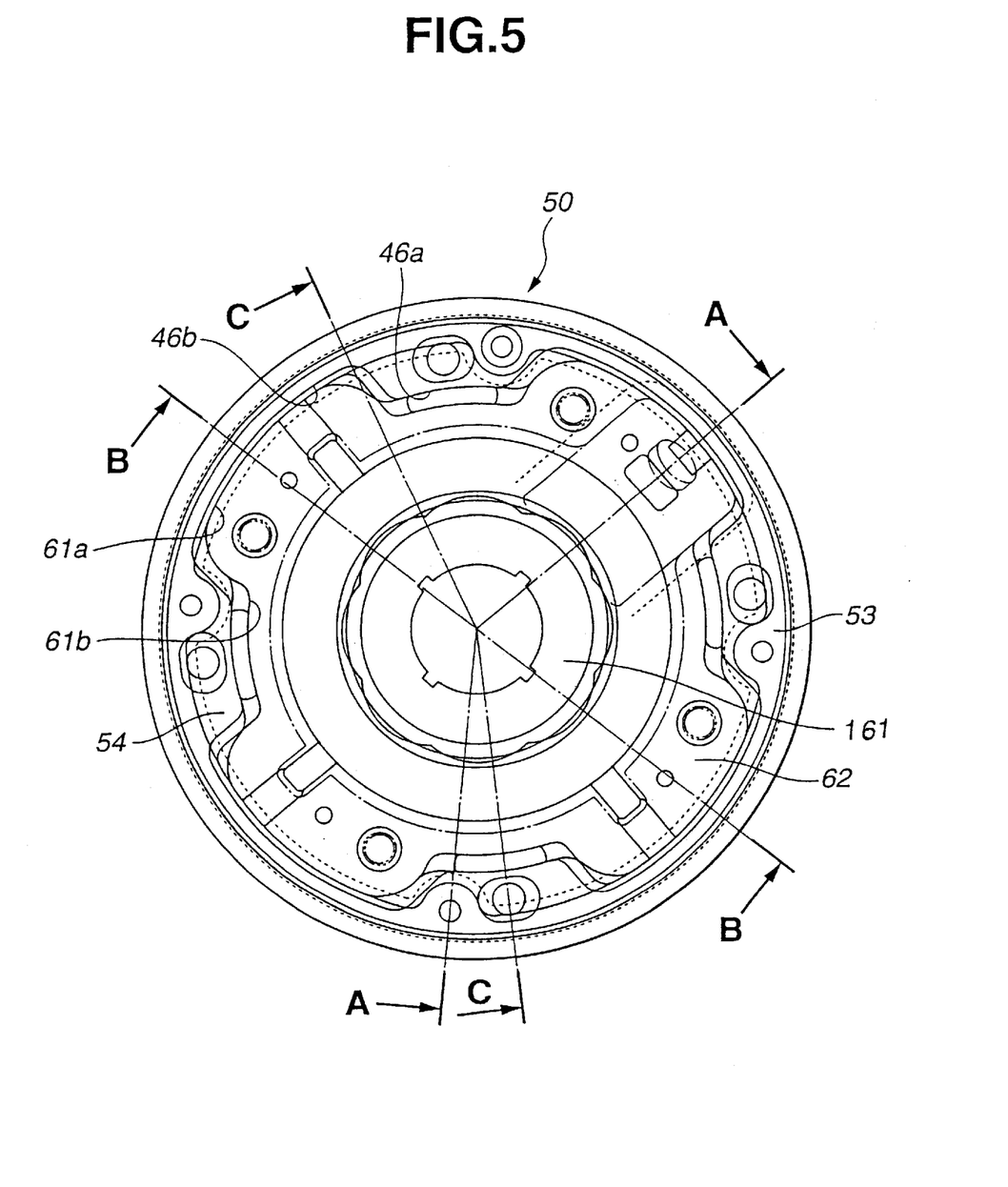
FIG. 5 is a rear view of the front cover assembly in the preferred embodiment.

FIG. 5 shows a rear view of the front cover assembly 50 as viewed from the motor A 15.

Figure 6:
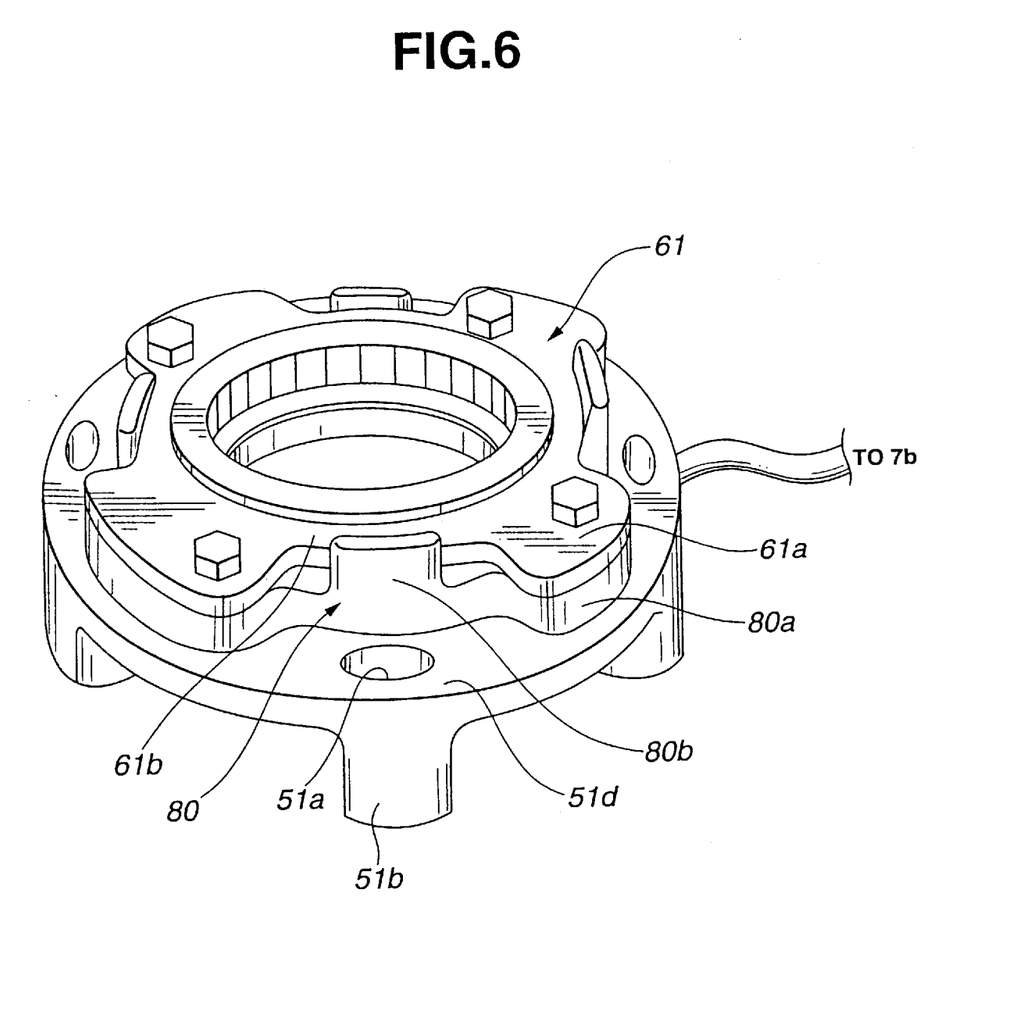
FIG. 6 is a perspective view of the front cover assembly as viewed from a motor A.

FIG. 6 shows a perspective view of the front cover assembly as viewed from the motor A 15.

The detailed structure of the front cover assembly 50 will be described below.

Within the front cover 51, a holder 52 to hold the electrode brush 11b and a resolver 60 to detect the revolution position of the rotor 16 are installed. A signal from this resolver 60 is supplied to the control unit 7b (not shown in FIGS. 3 through 6) via a harness. In addition, a harness holder 55 is disposed in the front cover 51 to hold the harness.

The front cover 51 includes: front cover convex portions 51b each of which serves as a bolt pedestal to attach the front cover 51 onto the first partitioning wall 46; and a front cover recess portion 51e. In addition, a pedestal 80 to hold a revolver-stator 61 is integrally formed on a motor chamber 44 of the front cover 51. The pedestal 80 includes a pedestal convex 80a and a pedestal recess 80b. The pedestal convex 80a serves as an attaching portion to attach the revolver-stator 61 by a bolt. The pedestal recess 80b is so constructed as to secure a plane of the front cover attaching portion 51d to attach the front cover 51 onto the first partitioning wall convex 46a.

The revolver-stator 61 is formed with a stator convex portion 61a coupled to the front cover 51 and a stator recess portion 61b to secure the plane of the front cover attaching portion 51d. In addition, a revolver-rotor 62 is attached to overlap on a resolver-rotor 161 in the axial direction and is so structured as to be integrally revolved with the input axle 12; the revolver-stator 61 and resolver-rotor 161 form a rotor 62 position detector.

A first partitioning wall convex 46a and first partitioning recess 46b are attached onto a supporting portion of the first partitioning wall 46 for the front cover 51. The first partitioning wall convex 46a is coupled to the front cover attaching portion 51d by a bolt 51c.

A magnetism shield plate 53 to shield a variation in a magnetic field developed by the motor A 15 is disposed in a motor chamber 44 of the front cover assembly 50. A metal gasket 54 is interposed between the front cover 51 and first partitioning wall 46. The metal gasket 54 serves to prevent splashing matters such as slurry and oil from invading the clutch chamber 47 and serves to prevent electrode brush abrasion powders (developed from a slide surface of the electrode brush 11b and a slip ring 11a) from invading the motor chamber 44.

Figure 7:
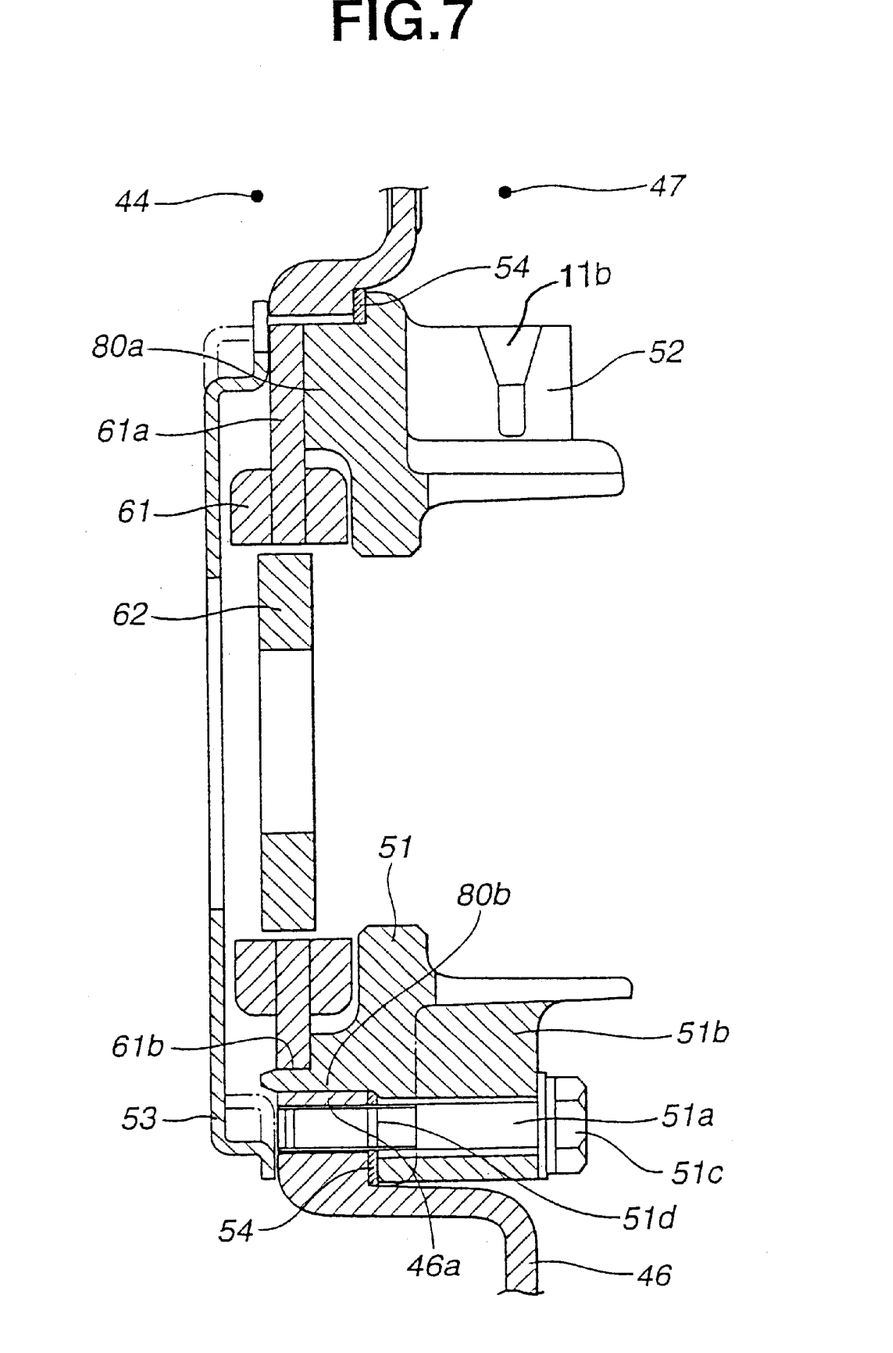
FIG. 7 is a cross sectional view cut away along a line A—A shown in FIG. 5.

FIG. 7 shows a cross sectional view of the front convex assembly cut away along a line A—A in FIG. 3. As shown in FIG. 7, the front cover 51 is fixed onto the first partitioning wall 46 by the bolt 51c. This bolt 51c is inserted in a bolt hole 51a disposed on the front cover convex portion 51b.

In addition, the front cover convex portion 51b is installed so as to be in the same plane as a part of the first partitioning wall 46 in which the stator is housed. Consequently, the front cover 51 can easily be assembled without interference of some tool against the first partitioning wall 46 so that an operability of the whole front cover assembly can be improved.

Furthermore, the bolt hole 51a of the front cover 51 is elongated and an assembly angle for the front cover 51 is adjustable over a range in which the bolt hole 51a is provided as appreciated from FIG. 3. This permits the position of the revolver-stator 61 to be adjusted even after the front cover 51 is assembled. In addition, the attaching portion of the front cover attaching portion attaching portion 51d and the first partitioning wall convex portion 46a and the stator recess portion 61a are coupled.

The front cover recess portion 51e, the pedestal convex portion 80a, the stator convex portion 61a, and the first partitioning wall recess portion 46b are constituted. Thus, the revolver-stator 61 and the front cover 51 are overlapped axially. Thus, both the resolver 61 and the front cover 51 can be attached onto the first partitioning wall 46 without increase in the axial direction.

Figure 8:
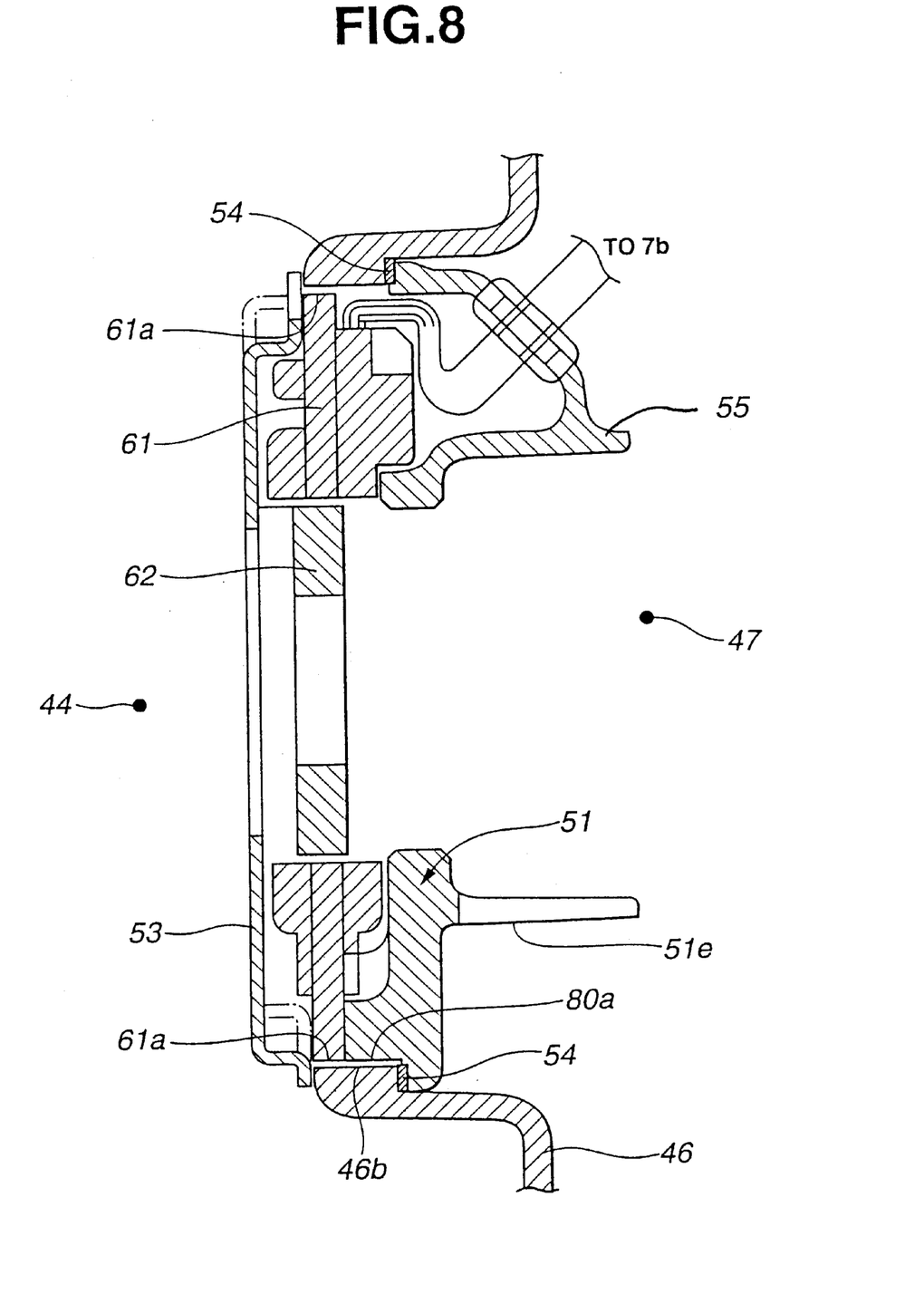
FIG. 8 is a cross sectional view cut away along a line B—B shown in FIG. 5.

FIG. 8 shows a cross sectional view cut away along a line B—B of the front cover assembly 50.

As shown in FIG. 8, the harness holder 55 to hold a harness via which a signal of the revolver-stator 61 is supplied to the control unit 7e in FIG. 1.

In this cross sectional view, the pedestal convex portion 80a, the stator convex portion 61a, and the first partitioning recess portion 46b are coupled.

Figure 9:
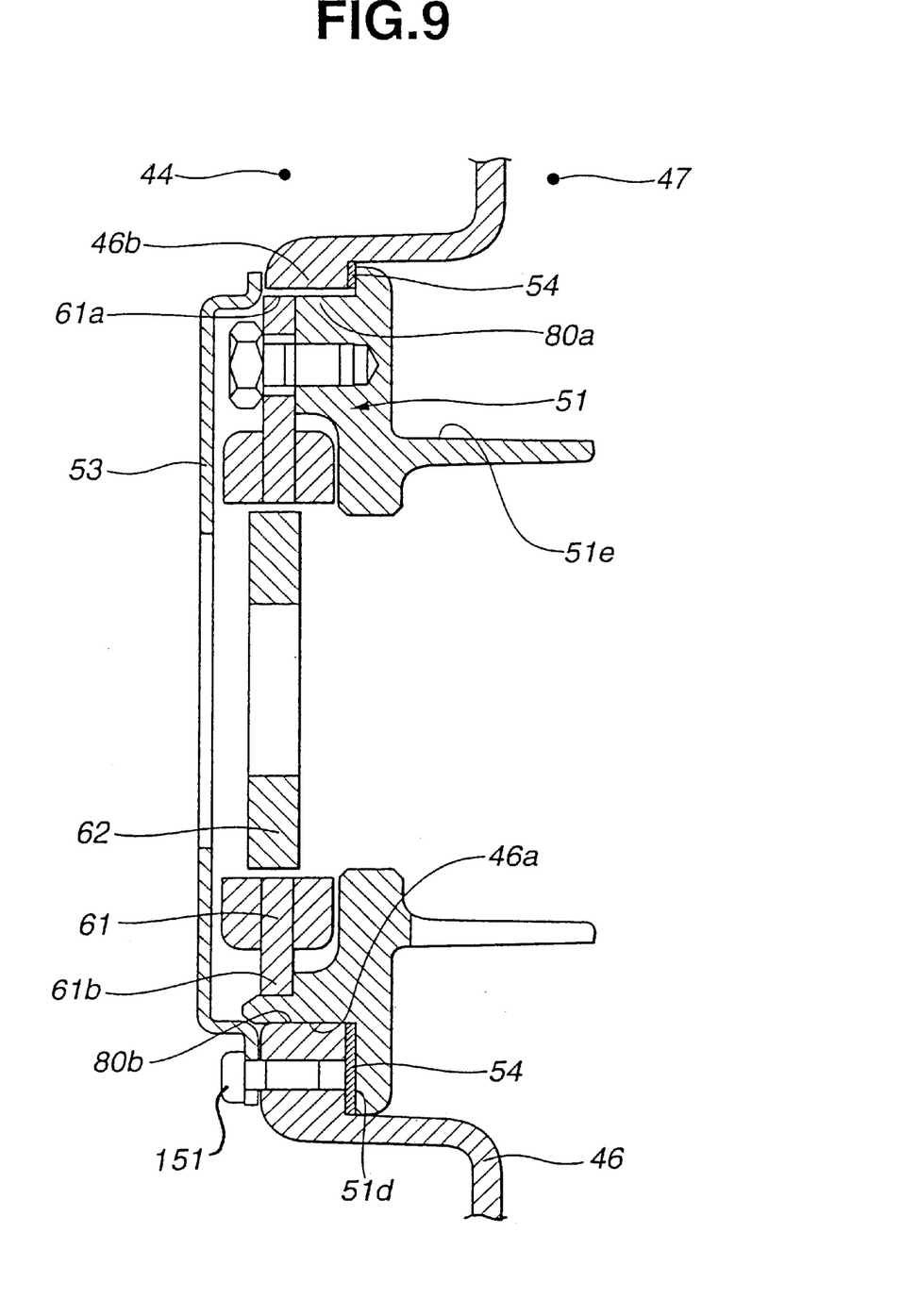
FIG. 9 is a cross sectional view cut away along a line C—C shown in FIG. 5.

FIG. 9 shows a cross sectional view of the front cover assembly 50 cut away along a line C—C.

As shown in FIG. 9, the revolver-stator 61 is fixed by a front cover 51.

In addition, the magnetic shield plate 53 is fixed onto the first partitioning wall 46 by a bolt. In this cross section of FIG. 9, the pedestal convex portion 80a, the stator convex portion 61a, and the first partitioning wall recess portion 46b are coupled together.

As described above, in the transmission unit of the hybrid vehicle in the preferred embodiment, the resolver 60 is disposed on the input axle at an inner side with respect to the stator 17 of the motor A 15. Consequently, since the stator 17 is overlapped in an axial direction, the increase in the axial length will not be introduced. Hence, the whole structure can be compacted.

The magnetic shield plate 53 is interposed between the motor A 15 and the resolver 60. That is to say, since the resolver 60 receives an influence of the magnetism, it is susceptible to a variation of the magnetic field developed in the motor A 15. However, the magnetism shield plate 53 can prevent the influence of the magnetic field from occurring so that the resolver 60 can positively be disposed at a position adjacent to the motor A 15. In addition, the unit housing of the transmission unit 1 includes a clutch chamber 47 to house an electromagnetic clutch 11, a motor chamber 44 to house the motor A 15, and a transmission hydraulic chamber 43 to house the CVT 13 as a hydraulic chamber.

The resolver 60 includes a resolver-rotor 62 which revolves together with the input axle 12 and the revolver-stator 61 fixed on the front cover 51. The front cover 51 is attached onto the first partitioning wall 46 so as to enable a relative revolution in a rotation direction within a predetermined angle. The first partitioning wall 46 defines the clutch chamber 47 and the motor chamber 44.

That is to say, since the revolver-stator 61 is disposed on the first partitioning wall 46 to define the clutch chamber 47 and motor chamber 44, the adjustment for the position of the resolver 60 can be made after the assembly thereof.

A metal gasket 54 is disposed between the front cover 51 and the first partitioning wall 46. That is to say, the gasket 54 serves to prevent a slurry or oil from invading the clutch chamber, such as might otherwise be caused by a slurry or oil splash due to the rotation of the electromagnetic clutch 11, i.e., the gasket 54 serves to disperse the splash. At this time, the metal gasket 54 is installed between the front cover 51 and the first partitioning wall 46 so that an invasion of the splash into the motor chamber 44 can be prevented.

The holder 52 of an electrode brush 11b (via which the powder is supplied to the electromagnetic clutch 11), which engages and disengages to and from the engine output axle 10 and input axle 12, is disposed on the front cover 51.

Hence, it is not necessary to construct the holder 52 of the electrode brush 11b separately. Further, the number of parts on the front cover 51 can, thus, be reduced.

The front cover attachment portions 51d are alternatingly disposed with the same peripheral surface divided so as to be overlapped in the axial direction. That is to say, in a case where no division on the same peripheral surface is carried out, the revolver-stator 61 is attached on the front cover 51 and both front cover 51 and the attaching portion of the first partitioning wall 46 need to be disposed on the further outer periphery of the attachment portion. Further, when the pedestal 80 is disposed between the revolver-stator 61 and the front cover 51, the pedestal convex portion 80a and the pedestal recess portion 80b, formed on the pedestal 80, divide the same peripheral surface, the recess portions 80b substantially aligning with the front cover attachment portions 51d.

It becomes possible to overlap both attaching portions by disposing both attaching portion 80a on the revolver-stator 61 and the attaching portion 51d on the first partitioning wall 46. Consequently, the revolver 60 can be positioned in the front cover 51 without increasing the dimension in the axial direction.

The entire contents of Japanese Patent Application No. 2000-079547 filed in Japan on Mar. 22, 2000 is herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A transmission unit for a hybrid vehicle, comprising:
    an electromagnetic clutch;
    an electric motor;
    a transmission comprising an input axle to input revolution from the electromagnetic clutch to the electric motor and to a transmission mechanism section thereof; and
    a rotor position detector adapted to detect a revolution position of a rotor of the electric motor,
    wherein the rotor position detector is disposed on the input axle of the transmission at an inner side with respect to a stator coil of the electric motor, and wherein the rotor position detector is positioned in a space substantially between an axial end of the stator coil.

2. A transmission unit for a hybrid vehicle as claimed in claim 1, further comprising a magnetism shield plate extended between the rotor of the electric motor and the rotor position detector to shield a magnetic field developed by the electric motor from affecting an operation of the rotor position detector.

3. A transmission unit for a hybrid vehicle as claimed in claim 1, further comprising:
    a housing of the transmission unit, the transmission unit housing defining a first dry chamber in which the electromagnetic clutch is housed, a second dry chamber in which the electric motor is housed, and a wet chamber in which the transmission is housed and in which a lubricating oil is allowed to enter,
    wherein the rotor position detector comprises a resolver-rotor that revolves together with the input axle of the transmission and a revolver-stator fixed onto a front cover, and wherein the front cover is attached onto a partitioning wall of the unit housing to define the first and second dry chambers to enable a relative revolution to the partitioning wall within a predetermined angle in a revolution direction.

4. A transmission unit for a hybrid vehicle as claimed in claim 3, further comprising a metal gasket interposed between the front cover and the partitioning wall.

5. A transmission unit for a hybrid vehicle as claimed in claim 4, wherein the front cover comprises a holder for holding an electrode brush via which a power supply is supplied to the electromagnetic clutch.

6. A transmission unit for a hybrid vehicle comprising:

an electromagnetic clutch;

an electric motor;

a transmission comprising an input axle to input revolution from the electromagnetic clutch to the electric motor and to a transmission mechanism section thereof;

a rotor position detector adapted to detect a revolution position of a rotor of the electric motor, the rotor position detector being disposed on the input axle of the transmission at an inner side with respect to a stator coil of the electric motor;

a housing of the transmission unit, the transmission unit housing defining a first dry chamber in which the electromagnetic clutch is housed, a second dry chamber in which the electric motor is housed, and a wet chamber in which the transmission is housed and in which a lubricating oil is allowed to enter; and a metal gasket interposed between a front cover and a partitioning wall, wherein the rotor position detector comprises a resolver-rotor that revolves together with the input axle of the transmission and a revolver-stator fixed onto the front cover, wherein the front cover is attached onto the partitioning wall of the unit housing to define the first and second dry chambers to enable a relative revolution to the partitioning wall within a predetermined angle in a revolution direction, wherein the front cover comprises a holder for holding an electrode brush via which a power supply is supplied to the electromagnetic clutch, wherein the partitioning wall is attached to the front cover in a plurality of first portions, wherein the front cover is attached to the revolver-stator in a plurality of second portions, and wherein the first and second portions are alternatingly disposed around a surface of the front cover.

7. A transmission unit for a hybrid vehicle as claimed in claim 6, wherein the front cover comprises a harness holder to hold a harness from the revolver-stator and via which a detection signal of the rotor position detector is supplied to a motor control unit.

8. A transmission unit for a hybrid vehicle as claimed in claim 6, wherein the front cover is fixed to the partitioning wall by a bolt positioned in a corresponding bolt hole provided in a front cover recess portion, and wherein the bolt hole is long enough to adjust a front cover assembly angle of the front cover with respect to the partitioning wall.

9. A transmission unit for a hybrid vehicle as claimed in claim 6, wherein the front cover comprises an electrode brush holder via which a power supply is supplied to the electromagnetic clutch.

10. A transmission unit for a hybrid vehicle comprising:

an electromagnetic clutch;

an electric motor;

a transmission comprising an input axle to input revolution from the electromagnetic clutch to the electric motor and to a transmission mechanism section thereof;

a rotor position detector adapted to detect a revolution position of a rotor of the electric motor, the rotor position detector being disposed on the input axle of the transmission at an inner side with respect to a stator coil of the electric motor;

a housing of the transmission unit, the transmission unit housing defining a first dry chamber in which the electromagnetic clutch is housed, a second dry chamber in which the electric motor is housed, and a wet chamber in which the transmission is housed and in which a lubricating oil is allowed to enter; and a metal gasket interposed between a front cover and a partitioning wall, wherein the rotor position detector comprises a resolver-rotor that revolves together with the input axle of the transmission and a revolver-stator fixed onto the front cover, wherein the front cover is attached onto the partitioning wall of the unit housing to define the first and second dry chambers to enable a relative revolution to the partitioning wall within a predetermine angle in a revolution direction, wherein the front cover comprises a holder for holding an electrode brush via which a power supply is supplied to the electromagnetic clutch, wherein the partitioning wall is attached to the front cover in a plurality of first portions, wherein the front cover is attached to the revolver-stator in a plurality of second portions, and wherein the first and second portions are alternatingly disposed around a surface of the front cover in a circumferential direction of the transmission.

* * * * *